Jan. 21, 1941.  E. H. KOCHER  2,229,096
POWER PRESS LUBRICATION
Original Filed July 9, 1935    6 Sheets-Sheet 2
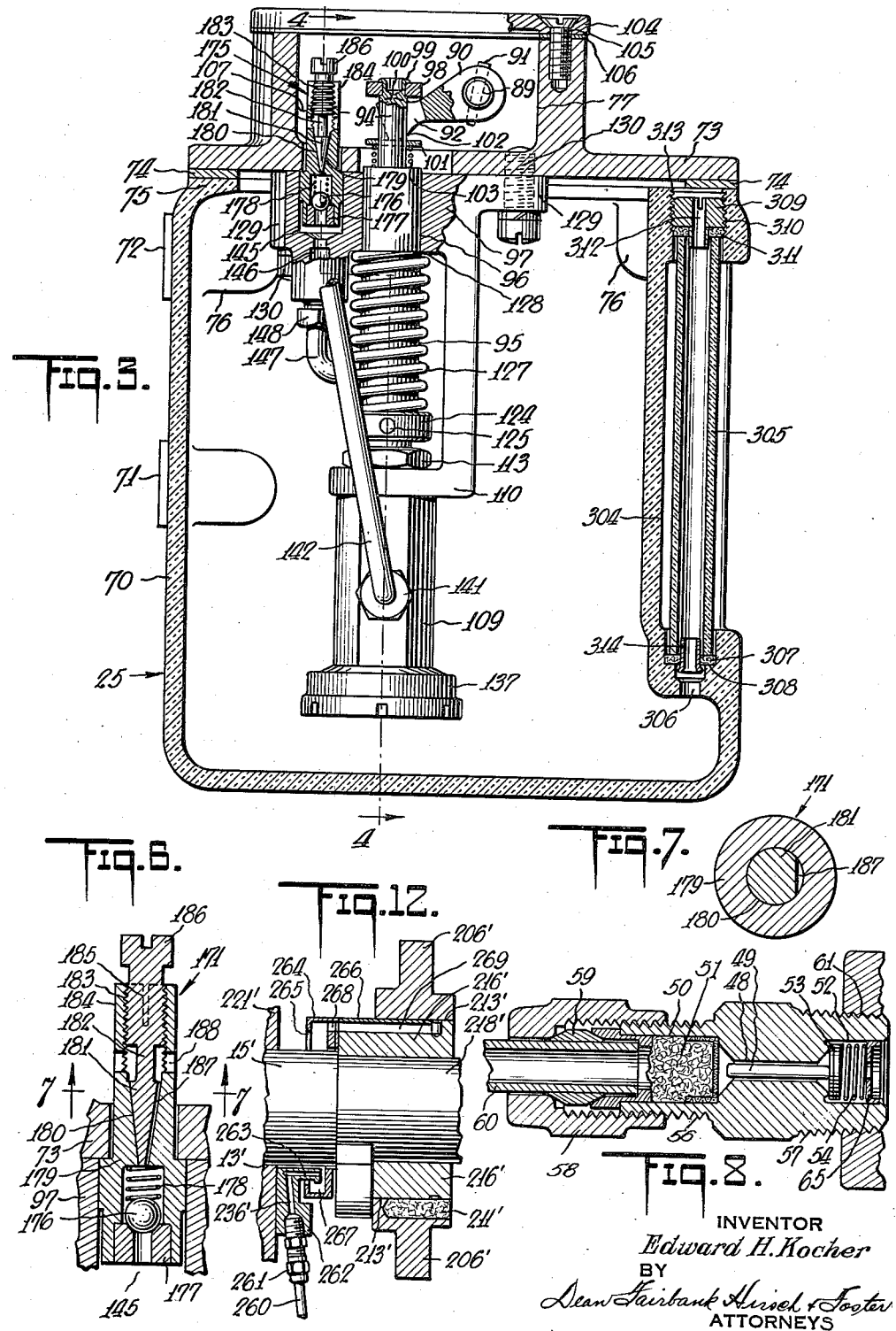
INVENTOR
Edward H. Kocher
BY
Dean Fairbank Hirsch & Foster
ATTORNEYS

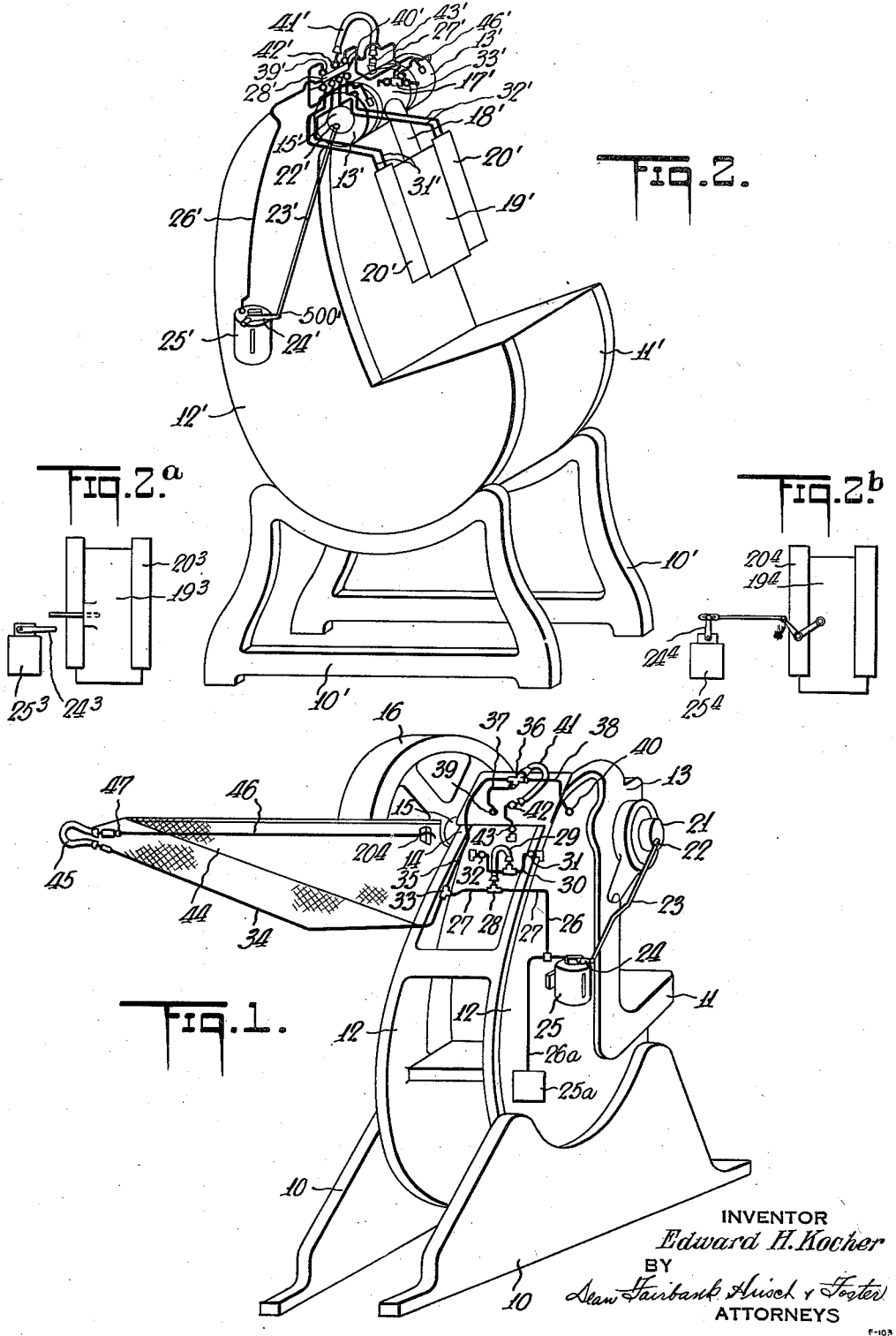

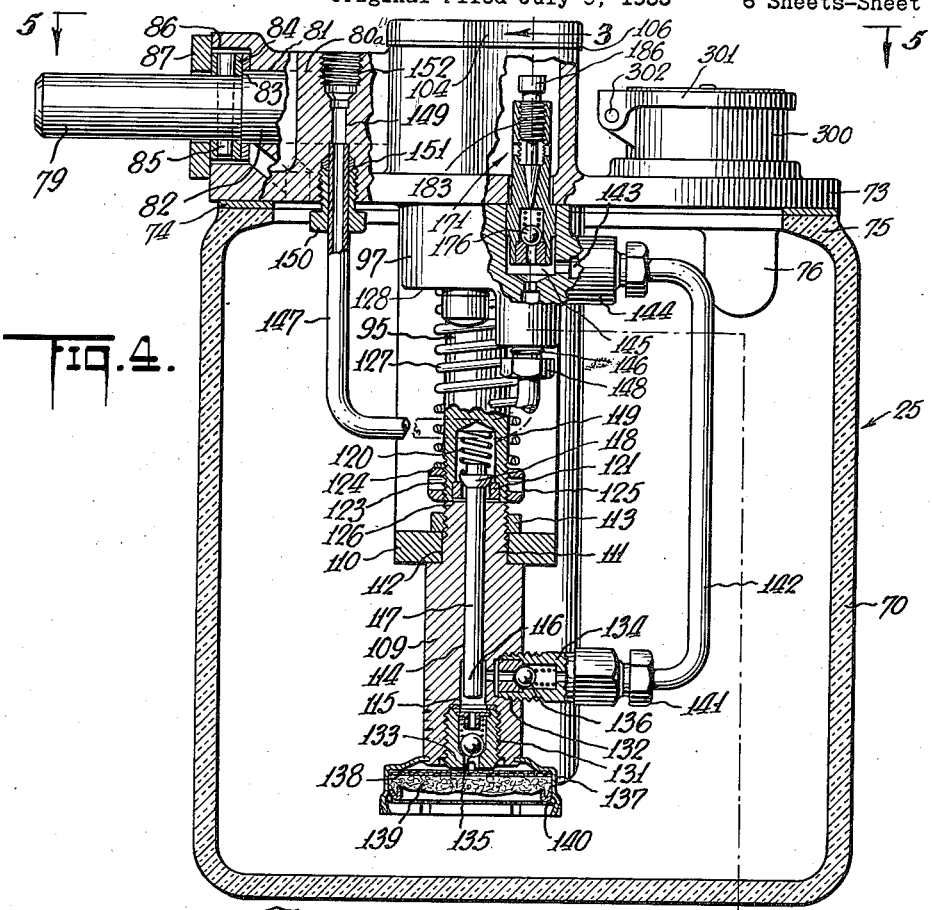

Jan. 21, 1941.   E. H. KOCHER   2,229,096
POWER PRESS LUBRICATION
Original Filed July 9, 1935   6 Sheets-Sheet 4
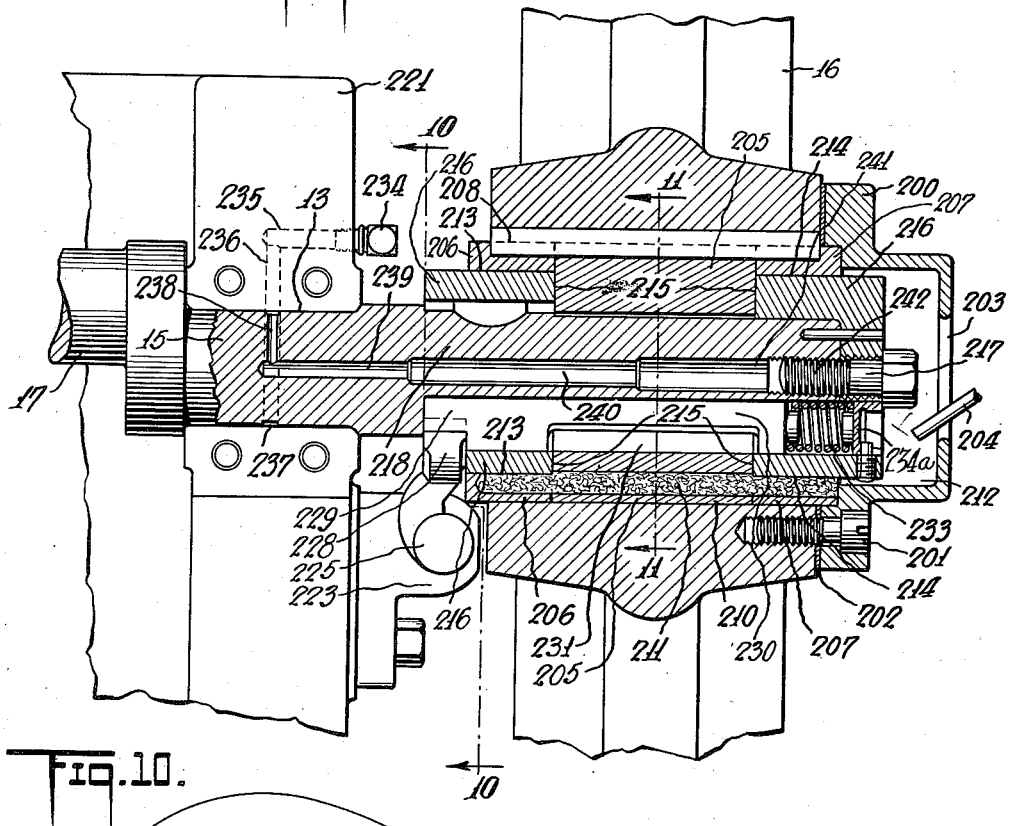
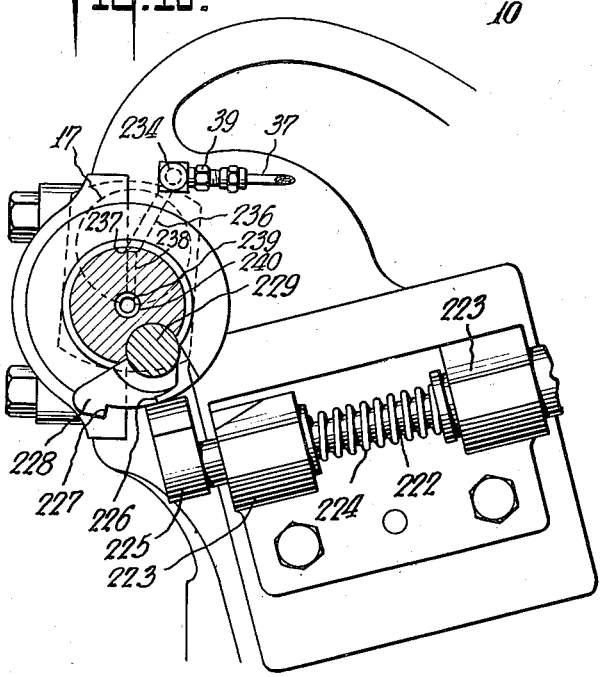
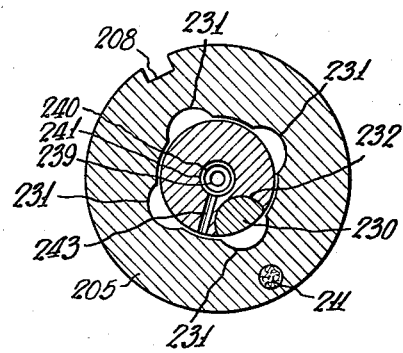
INVENTOR
Edward H. Kocher
BY
Dean Fairbank Hirsch & Foster
ATTORNEYS Jan. 21, 1941.  E. H. KOCHER  2,229,096
POWER PRESS LUBRICATION
Original Filed July 9, 1935   6 Sheets-Sheet 5
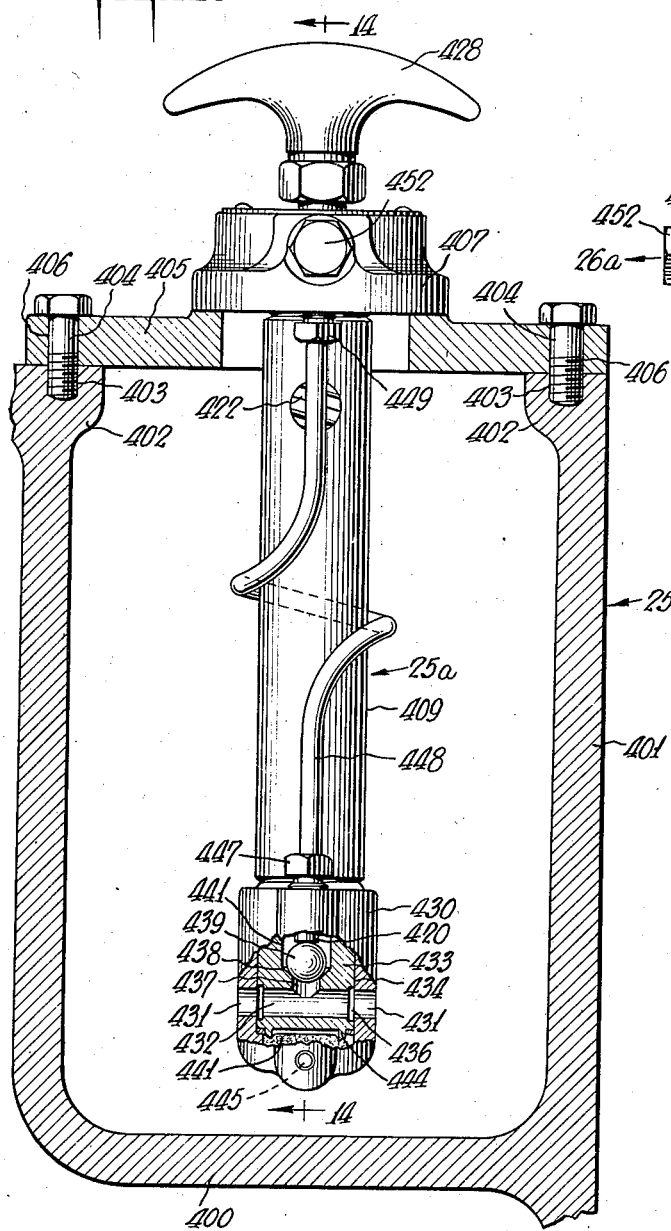
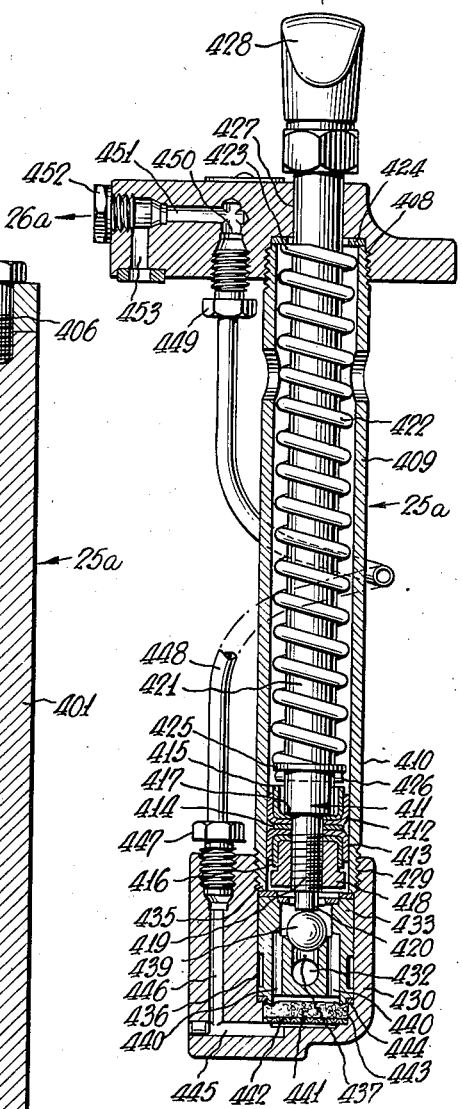
INVENTOR
Edward H. Kocher
BY
Dean Fairbank Hirsch & Footer
ATTORNEYS

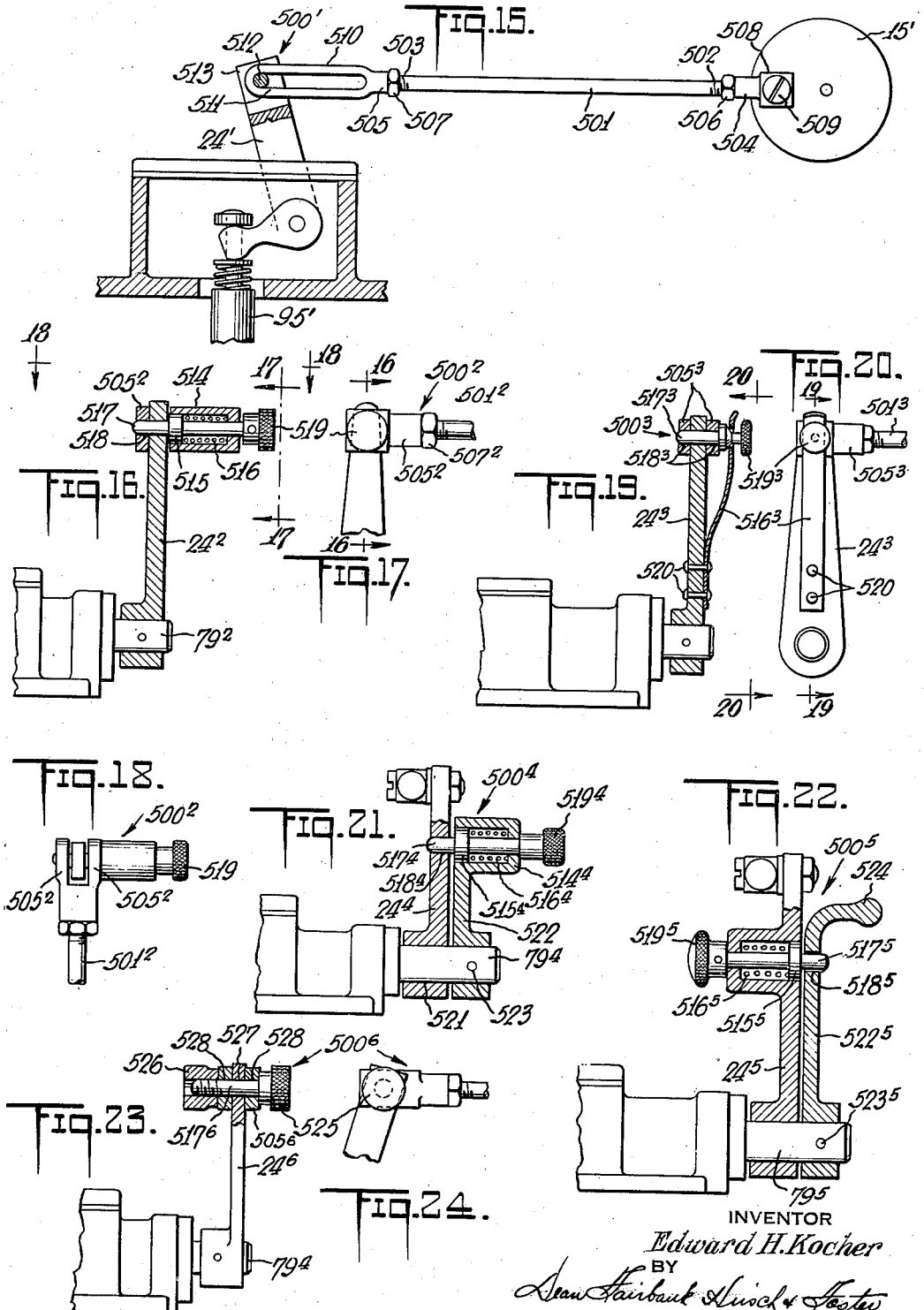

Patented Jan. 21, 1941

2,229,096

UNITED STATES PATENT OFFICE 2,229,096

POWER PRESS LUBRICATION

Edward H. Kocher, Boonton, N. J., assignor to Auto Research Corporation, a corporation of Delaware Application July 9, 1935, Serial No. 30,462
Renewed April 26, 1940

26 Claims. (Cl. 184—6)

The present application relates to a centralized lubricating system, and it particularly relates to an automatic lubricating system particularly adapted for supplying small quantities of lubricant to spaced and distributed bearings of a mechanism.

In Patents No. 1,632,771 and No. 1,632,772, there is disclosed a centralized lubricating system in which the lubricant is fed from a central pump through a branched distributing system to a plurality of spaced and distributed bearings, which require relatively minute, yet accurately proportioned quantities of oil, preferably throughout operation of the mechanism. These patents specifically disclose the application of the system to the feeding of lubricant to the spaced bearings of an automobile chassis, but it is made clear that such drip plug system may be broadly applied to varying mechanisms.

These systems were designed to be actuated once a day or once for one hundred miles operation, the system being actuated by means of an operator actuating spring-returned plunger, which, upon being actuated, charged the pump and then subsequently upon release caused discharge to the line, forcing a desired quantity of lubricant through the various high resistance drip plug outlets usually positioned at or adjacent to the bearings.

Where in some cases it was desirable to employ a continuous lubricating system which would feed the relatively minute quantities of lubricant to the bearings at frequent intervals, it was found satisfactory to use a smaller pump which would be automatically actuated incidental to the operation of the machinery to be lubricated. With such a pump smaller quantities of lubricant would be forced into the centralized lubricating system at short intervals, the resiliency of the piping system being sufficient to smooth out the pressure impulses and convert such pressure impulses into a substantially continuous discharge feeding pressure at the drip plug outlets to the bearings.

Suitable centralized lubricating pumps for systems of this character are shown and described in copending applications Serial No. 468,790, filed July 18, 1930 now Patent No. 2,145,854, and Serial No. 523,668, filed March 19, 1931, now Patent No. 1,998,438, and in these applications a relatively small diameter piston is substantially continuously reciprocated by a motor, such as a diaphragm motor operated by variations in vacuum in the intake manifold.

The piston is preferably not packed, but is provided with a long elongated cylinder, the lower portion of which is provided with inlet and outlet ports receiving lubricant from a reservoir and discharging it to the drip plug system.

The pump, as shown in these applications, Serial No. 468,790 and Serial No. 523,668, was found most satisfactory for chassis lubricating systems, and it is among the objects of the present invention to provide a system and central pressure and supply unit which will utilize this pump for assuring a satisfactory supply of lubricant to a central system for industrial mechanism, not associated with a moving vehicle.

In applying this pump mechanism to industrial installations, such as punch presses, machine tools, textile machinery, printing presses, automatic calculating machines, automatic lamp machinery, and so forth, it was found desirable to have a pump which could be adjusted to accommodate a varying number of bearings on one or more machines, as might be desired, and it was also found desirable to have means whereby the pump might be controlled to discharge predetermined amounts of lubricant, even though oils of different viscosities be employed and even though the lubricant viscosity vary with diverse atmospheric temperatures, so that the bearings will be supplied at all times with proper amounts of lubricant throughout operation without drippage.

It is therefore a further object of the present invention to provide a centralized automatic reciprocating pump of the character described which may be readily utilized in connection with centralized drip plug distributing systems for industrial machinery, and which is readily adapted to supply any desired number of bearings with the proper amounts of lubricant without drippage, even though the number of bearings be increased or decreased, and the lubricating system be extended to various adjacent machinery, and also even though various actuator elements on the machine be utilized to actuate the pump.

Another object is to provide a centralized lubricating supply unit of the character described which may be readily positioned in a lubricant pocket in or about the machine and/or provided with its own reservoir to be associated with or supported on the machine.

In accomplishing the above objects, it has been found most satisfactory to utilize substantially identically a similar pump unit as disclosed in applications, Serial No. 468,790 and Serial No. 523,668, but to modify the motor unit so that a reciprocating or rotating shaft might be caused by a satisfactory lever or linkage arrangement to cause a rapid, substantial continuous, reciprocatory movement of the plunger thereof of substantially the desired stroke and frequency.

The plunger size of the pump and the frequency of stroke are usually controlled so as to be far in excess of the possible requirements of the bearings of the mechanism to be lubricated. Then to regulate the discharge of the pump, an adjustable by-pass is preferably provided in parallel with the drip plug outlets, which by-pass may be adjusted in accordance with the number of bearings or machines to be lubricated.

The adjustable outlet also may take care of the variation in the speed of the shaft or reciprocating device upon the machine which is utilized to drive the pumping device. It is most desirable to construct the pump so that it will depend substantially below the actuating mechanism therefor, with the result that the cylinder-plunger combination thereof together with its inlet and outlet connections may be conveniently positioned either in the individual reservoir applied to the outside of the mechanism or in a lubricant pocket in the machine structure itself.

By this construction the driving shaft or actuating mechanism may be connected to the top of the reservoir above the oil level, eliminating the necessity of providing packing glands or other devices to avoid draining the reservoir. The improved pump and distributing system of the present invention will be illustratively described and shown in association with a power press, to the lubrication of which it is particularly adapted.

In the drawings of which are shown some of the several embodiments which may be employed, Fig. 1 is a rear perspective view of one type of a power press mechanism showing the lubricating system of the present invention applied thereto;

Fig. 2 is a front perspective view of another power press mechanism upon the same scale as Fig. 1 illustrating an alternative arrangement of the lubricating system of the present invention;

Figs. 2a and 2b diagrammatically indicate alternative arrangements for operating the pump from the reciprocating sliding element of the press;

Fig. 3 is a side sectional view of the pump unit upon an enlarged scale upon the line 3—3 of Fig. 4;

Fig. 4 is a side sectional view upon the same scale as Fig. 3 on line 4—4 of Fig. 3;

Fig. 5 is a top view upon the same scale as Fig. 4 on the line 5—5 of Fig. 4;

Figs. 6 and 7 illustrate the adjustable feed and discharge control device of the pump upon an enlarged scale, Fig. 6 being a longitudinal sectional view thereof and Fig. 7 being a transverse section upon the line 7—7 of Fig. 6;

Fig. 8 is a longitudinal sectional view of a typical drip plug outlet;

Figs. 9, 10 and 11 illustrate the application of the lubricating installation of the present application to the rolling key clutch and the fly wheel bearing of a power press, Fig. 9 being a longitudinal sectional view through the bearing, Fig. 10 being a side view upon the line 10—10 of Fig. 9, and Fig. 11 being a transverse sectional view upon the line 11—11 of Fig. 9;

Fig. 12 illustrates another method of lubricating the rolling key clutch and fly wheel bearings;

Figs. 13 and 14 illustrate a manually controlled auxiliary pump construction which may be utilized to enable shots of lubricant to be given to the system at desired intervals, Fig. 13 being a side sectional view and Fig. 14 being a transverse sectional view upon the line 14—14 of Fig. 13.

Figs. 15 to 22 show alternative driving connections permitting optional manual operation of the pump; Fig. 15 being a side sectional view of one embodiment; Fig. 16 being a side sectional view of a second embodiment upon the line 16—16 of Fig. 17 and Figs. 17 and 18 being respectively side and top views upon the lines 17—17 and 18—18 of Fig. 16; Figs. 19 and 20 showing another embodiment, Fig. 19 being a side sectional view upon the line 19—19 of Fig. 20 and Fig. 20 being a side view upon the line 20—20 of Fig. 19; Figs. 21 and 22 respectively showing still other embodiments in side section, and Figs. 23 and 24 showing a further embodiment respectively in side section and side elevation.

Referring to Figs. 1 and 2 (similarly functioning parts in Fig. 2 being indicated by the same numerals as in Fig. 1, but primed), the punch presses are provided with stands 10 and 10' which support the tables 11 and 11', the side frame members 12 and 12' being carried by said supports 10 and 10' and extending upwardly to provide bearing structures 13 and 13' for the shaft 15 which carries the fly wheel 16 and the crank 17'.

The crank 17' (see Fig. 2) has a link connection 18' to the hammer element 19' which reciprocates in the usual slides 20'. The power press constructions shown in Figs. 1 and 2 are diagrammatic and do not form part of the present invention. The punch press structures shown are capable of a large variety of different designs, of which the present designs are merely illustrative.

To the ends 21 and 21' of the fly wheel shaft 15 by the eccentric connections 22 and 22' are connected the links 23 and 23', which extend downwardly to actuate the lever 24 and 24' of the pump structures 25 and 25', which pump structure will be more fully described in connection with Figs. 3 to 7.

Fig. 1 also shows an auxiliary pumping mechanism 25a having the outlet connection 26a, which may be manually controlled, which mechanism will be more fully described in connection with Figs. 13 and 14. In Fig. 1 the main lubricant line 26 leads across the back of the machine 27 past a junction 28. The junction 28 is connected to the hose 29, feeding the subsidiary system 30, having the drip plug outlets 31 and 32, respectively feeding the slide bearings of the press.

In Figs. 1 and 2 the drip plugs are represented by the small circles while the junctions are represented by geometrical straight side figures. At the further junction 33 the lubricant line 27 branches into the lines 34 and 35, the line 35 leading to the junction 36, from which the lines 37 and 38 respectively extend to the drip plugs 39 and 40, feeding the crank bearings.

The hose 41 also leading from the junction 36 feeds the drip plug 42 supplying the ram head and the drip plug 43 supplying the ram adjusting screw. The line 34 extends along the screen enclosure 44 to the flexible hose 45, which connects to the line 46, said line 46 supplying the rolling key clutch through a dripper tube and a dripper bracket more fully shown and described in connection with Fig. 9. The hose 45 permits opening of the guard 44 without derangement or uncoupling of the lubricating system.

Each of the drip plugs 31, 32, 39, 40, 42 and 43 may take the form conveniently shown in application Serial No. 468,790, filed July 18, 1930, or other types of metering fittings may be employed, such as shown in application Serial No. 596,856, filed October 25, 1922 now Patent No. 2,017,848.

A preferred form, however, is shown in Fig. 8, in which the drip plug body is provided with a central bore 48 to receive a pin 49, which central bore is enlarged at its ends to form the socket 50, receiving the inlet strainer 51, and the outlet socket 52, receiving the valve 53, which is seated by the light spring 54, reacting against the retainer 55. The inlet and outlet ends are respectively threaded, as indicated at 56 and 57, the inlet end receiving the nut 58, which together with the oppositely tapered coupling sleeve 59 makes a coupling to the pipe 60 and the threaded outlet end being screwed into a tapped socket 61 in the bearing structure.

In Fig. 2, the pump 25' feeds the main trunk line 26' which extends to the junction 28' located at the upper part of the machine. The junction preferably carries seven drip plugs, indicated by the circles, the lower four of which respectively feed the pipe lines 31' and 32' leading to the slide bearings 20'. The middle upper drip plug 42' feeds the U-bent hose 41' which leads to the ram head, as indicated at 43'.

The two drip plugs 39' and 40' respectively feed the crank bearings 13'. From the end of the junction 28' extends the line 27', which leads to the junction 33' to which are connected three outlet drip plugs, the two drip plugs at the side of the junction feeding the clutch operating shaft and the drip plug at the top of the junction feeding the rolling key clutch by the line 46'.

In cases where it is desirable to also provide means for optionally lubricating the apparatus at the desired interval by a manually actuated device, this may be accomplished by providing a manually actuated pump, either in the same reservoir as the automatic pump, or as indicated in Figs. 1, 13 and 14, by locating such pump in a separate reservoir pocket in or about the power press mechanism.

Referring to the pump structure, best shown in Figs. 3 to 5, the pump is illustratively embodied in a cast iron housing 70 which is provided with the tapped bosses 71 and 72 (see Figs. 3 and 5) to enable convenient attachment thereof to a place on the frame 12 (see Figs. 1 and 2). If desired, however, it is to be understood that a convenient pocket in the machine structure may be employed instead of the reservoir 70 (for example see Fig. 13).

The entire pump structure and actuating mechanism is conveniently carried on a cover element 73. The cover 73 is connected in liquid-tight manner by the gaskets 74 to the upper rim 75 of the container 70, the bolts 76a at the corners of the casing being screwed into the tapped openings in the bosses 76 of the housing 70.

The cover plate 73 carries the reception pocket 77, the side 78 of which pocket carries the shaft 79 which extends through the shaft enclosure or boss 80a. The shaft enclosure 80a is provided with a bore 81 (see Fig. 4), which serves as a bearing for the enlarged portion 82 of said shaft 79. The shaft 79 is shouldered at 83, and said shoulder receives a washer 84 which is fixed in position by the tapered pin 85. The washer 84 is received in a recess 86 at the end of the element 80a, which recess 86 is closed by the plate 87. The portion of the shaft 79, which projects within the cup-like enclosure 77, is provided with a reduced extension 89, upon which is fitted the lever 90 which is fixed thereto by the tapered pin 91.

The lever 90 is clevised at 92 and in the recess 93 between the clevis jaws 92 thus formed, is received the upper end 94 of the connecting rod element 95 which bears at 96 in the depending structural member 97. To the upper end of the extension 94 is attached the disk 98 which is held in position by the peaned-over portion 99 of the upper end of the extension 94. It will be noted that the upper sides of the clevis jaws 92 are rounded at 100, as best shown in Fig. 3, so that they will pivotally ride upon the undersurface of the disk 98.

The lower disk 101 (see Fig. 3) fits on the extension 94 and is held up against the lower rounded face 102 of the clevis jaws 92 by the coil spring 103. The spring 103, in pressing the disk 101 against the clevis jaws, will prevent play therebetween. The upper part of the enclosure 77 is closed by the cover 104, which is connected to the walls of said enclosure by the screws 105 and the gaskets 106 in a lubricant-tight fashion. The enclosure 77 is normally maintained partly filled with lubricant in a manner to be described, up to the level of the over-flow shelf 107 which is provided with the over-flow bore 108 (see Figs. 3 and 5).

Referring to Figs. 3 and 4, the pump block 109 is supported by the bracket 110, the smaller diameter threaded portion 111 of the pump block 109 projecting into the opening 112 and being fixed thereto by the nut 113. The pump block is provided with a central bore 114, the lower portion of which is enlarged, as indicated at 115, to form the charging and discharging chamber of the pump into which the lower end 116 of the plunger 117 extends.

The upper end of the plunger 117 (see Fig. 4) is provided with a semi-spherical socket element 118, which is received in the socket 119 in the end of the connecting element 95 and is pressed down by the coil spring 120 against the annular closure ring 121 at the lower end of said socket 119.

The connection thus shown prevents excessive pressure from being generated in the piping system, since if an excessive pressure is created in the cylinder 115, the spring 120 will collapse and permit relative motion between the connecting rod 95 and the piston 117 without moving said piston 117 through the bore 114 to charge and discharge lubricant. The lower end of the connecting rod is threaded, as indicated at 123, and receives the nut member 124, said nut member being fixed in position by mutilating the thread 123 by a tool inserted through the opening 125.

It will be noted that the rod 95 is stopped at 126 upon the upper end of the nipple 111 of the block 109, limiting the downward movement of the plunger and connecting rod 95. The connecting rod 95 and the plunger 117 are normally retained in the lowermost position, as indicated at Fig. 4 by the coil spring 127, which reacts between nut 124 and the lower face 128 of the depending structure 97. The bracket 110 is provided with flanges 129 which receive the bolts 130 attached to the cover 73.

The pump block 109 (see particularly Fig. 4) is provided with the tapped inlet socket 131 and the tapped outlet socket 132 which connect with the enlarged charging and discharging chamber 115. The sockets 131 and 132 respectively receive the recessed threaded elements 133 and 134, the recesses of which receive the spring-seated ball checks 135 and 136, the spring-seated ball check 135 serving as an inlet valve and the spring-seated ball check 136 serving as an outlet valve.

To the lower part of the pump block 109 (see Fig. 4) is connected the downturned cup member 137, which receives the filter screens 138 and the felt filter 139, said felt filter being held in place by the snap ring 140. To the outlet recessed element 134 is connected the outlet pipe 142 by the coupling 141.

The lubricant is drawn into the chamber 115 from the reservoir 70 past the ball check 135 upon up-strokes of the plunger 117 with simultaneous stressing of the spring 127 and upon down-strokes of the plunger 117 the spring 127 expands and the lubricant charge is forced under pressure into the pipe 142, past the ball check 136.

The lubricant then passes from the tubing 142 (see Fig. 4) into the passageway 143 in a nipple 144 of the structure 97. The passageway 143 admits the lubricant to the chamber 145, where part will flow through the bore 146 to the outlet tubing 147 connected to said bore by the coupling 148.

The tubing 147, as best shown in Fig. 4, is connected to the bore 149 by the coupling nut 150 and the double tapered sleeve 151, and the bore terminates in the upper portion of the structure 80a in the tapped socket 152 to which a connection may be made to the outlet tubing 26 and 26' (see Fig. 2).

To enable the connection of the reciprocating shaft 79 to various parts of the machine to be lubricated and at the same time to assure proper supply of lubricant regardless of the number of bearings which may be lubricated, or the speed of rotation of the driving shaft, which in the present embodiment is the crank shaft 15 (see Figs. 1 and 2), an adjustable return drip plug 171 is provided, which is best shown in Figs. 3, 4, 6 and 7.

As shown, the adjustable drip plug 171 is provided with a ball check 176 having a seat 177 against which it is pressed by the spring 178. The upper part 175 of the adjustable drip plug body has a conical seat 180 in which the conical portion 181 is received. The conical portion 181 is connected by the stem 182 of reduced diameter to the threaded portion 183, which is received in a threaded sleeve 184 projecting upwardly from the shoulder 179 and split, as indicated at 185. (See Figs. 5, 6 and 7.)

The head of the portion 183 is provided with a fillister slotted portion 186 to receive a tool to lessen or increase the restriction 180—181. The split threaded sleeve 184 may tend to contract to frictionally lock the adjustable drip plug in position to give any desired degree of restriction.

The conical element 181 is flatted, as indicated at 187, and this flat assures a slight leak into the chamber 77 through the bore 188 (see Fig. 6) even though the adjustable drip plug 171 be screwed down as far as possible. This adjustable leak will permit the chamber 77 to be filled up to the level of the sleeve 107, the overflow of oil flowing back through the bore 188, assuring lubrication of the reciprocating mechanism in the cup 77.

The adjustable drip plug 171 is positioned in parallel with the drip plugs 31, 32, 39, 40, 43 and 47 which feed the various bearings of the power press to be lubricated.

These drip plugs may conveniently take the shape and form shown in Fig. 8. Figs. 9 to 12 show various arrangements for lubricating the fly wheel bearings.

Referring to Fig. 9, to the fly wheel 16 is bolted an end casing or dripper bracket 200 as indicated at 201. The gasket 202 assures a lubricant tight connection. The end of the cap 200 is provided with the opening 203 through which lubricant may be introduced as by the inlet conduit 204 from a central system as shown in Fig. 1.

To the fly wheel 16 is fixed the annular element 205 and the end elements 206 and 207, said elements being keyed at 208 to the fly wheel 16.

These elements are provided with a recess 210 which receives the wicking 211 which may absorb oil from the chamber 212, into which it was supplied from the pipe 204. The bearing surfaces to be lubricated are indicated at 213, 214 and 215.

The fly wheel 16 and the elements 205—206—207 keyed thereto at 208, while rotating, are adapted to bear on the tubular shaft element 216, which is bolted at 217 to the extension 218 of the crank shaft element 15 which carries the crank 17 inside of the structure 221 forming the crank shaft bearing 13 therefor.

When it is desired to operate the press, a foot pedal (not shown) may be caused to actuate a shaft 222 (see Fig. 10), which bears in the structures 223 and is provided with a spring 224, the end of said shaft being provided with the toothed bead 225 which cooperates with the shoulders 226 and 227 of the lever member 228 to turn the shaft 229 which is connected to the key element 230 (see Figs. 9 and 11). When the semi-circular key element 230 is in the position shown in Figs. 9 and 11 the fly wheel 16 will rotate freely on the elements 216 and 218. When the foot pedal (not shown) is actuated the semi-circular key element 230 will be turned into one of the pockets 231 from the pocket 232 which will cause the crank 17 to be rotated with the fly wheel 16. The key element 230 is normally kept in inoperative position by the spring 233 which is retained by the plate 234a (see Figs. 9 and 11).

To lubricate this construction, the tail pipe 204 (see also Fig. 1) may be employed by itself or in conjunction with the drip plug outlet 39 (see Figs. 1 and 10) screwed into the junction or adaptor 234. The adaptor 234 communicates by the bores 235 and 236 with the peripheral groove 237 in the shaft element 15. From the peripheral groove 237 leads the radial bore 238. The bore 238 communicates with the axial bore 239 which is enlarged, as indicated at 240 and 241, to enable an easier drilling operation and is closed off by the threaded shank 242 of the bolt 217.

The bore 241 feeds the bearing surfaces 213, 214 and 215 by the radial bore 243 and also saturates the wick 211. If desired, either the tail pipe 204 or the bores 239—240—241—243 may be used singly to lubricate the bearings 213—214—215 and where the tail pipe 204 is utilized, drip plug 234 may be permitted to supply the bearing 220 alone.

Where it is desired to feed the rolling key clutch and fly wheel bearing from the inside, the construction of Fig. 12 may be employed.

In Fig. 12, the side frame or structure 221' is provided with the bearing 13' for the crank shaft element 15'. The crank shaft extension 218' carries the tubular shaft element 216' on the exterior of which is adapted to rotate the element 206' which is connected to the fly wheel (not shown). The element 206' is provided with an opening or bore receiving a lubricant absorbing felt or wick 211'.

The lubricating system, as shown in Fig. 12, includes a feed pipe 260 leading to the drip plug 261 which is screwed in a socket in the junction member 262 having the drip element 263. The drip conductor 263 projects within the annular casing or trough 264, which is open, as indicated at 265, and which has an extension 266 located between the elements 206' and 216', as indicated in the upper portion of Fig. 12.

The lubricant, which flows by the drip conductor 263 into the trough 267 will be thrown outwardly by centrifugal force and will pass through the bores 268 and 269 to lubricate the bearing surfaces 213' and to supply the wick 211'.

It is thus apparent that the lubricating system of the present application may be particularly adapted to feed lubricant in small relatively minute but accurately proportioned quantities to the bearings of a relatively heavy industrial mechanism, such as a punch press, which system will be operated automatically to supply lubricant to the bearings of a punch press throughout operation thereof, according to the requirements of said bearings.

The centralized lubricating pump shown in Figs. 3 to 7, although particularly adapted to the lubrication of punch press mechanisms, is also applicable to other machinery.

The flow metering restriction element of Fig. 8, although preferred, may be replaced by other types of flow metering elements, such as disclosed in applications Serial No. 580,668, filed August 9, 1922, now Patent No. 1,975,920, Serial No. 596,856, filed October 25, 1922, now Patent No. 2,017,848, and Serial No. 9,544, filed February 16, 1925, now Patent No. 2,003,281.

In the power press structure of Fig. 1, feeding about 10 bearings, the pump is preferably actuated to take about 25 strokes per minute and to feed to the bearings about 10 c. c. of oil per hour in operation. With a larger or smaller number or size of bearings, a ready adjustment may be made of the element shown in Figs. 6 and 7.

With the structure, as shown in Fig. 2, the central pump is preferably caused to make between about 100 to 150 reciprocations per minute and to feed about 8 c. c. of lubricant per hour to 7 bearings.

Where lubricant of increased viscosity is utilized or when the atmospheric temperature falls, the pump will automatically increase the pressure in the line to assure about the same feed, since the pump is a constant volume pump and since the power available to reciprocate the plunger and discharge the pump will be tremendously greater at all times than the power consumed in forcing the lubricant into the distributing line. With lubricant of decreased viscosity or with higher atmospheric temperatures, a decreased line pressure will automatically result.

The adjustable needle valve device of Figs. 6 and 7, may be adjusted to correct for additional or smaller number or size of bearings and/or to lessen or increase the feed to the bearings. The needle valve device is designed to have a restricting effect of the same order of the flow metering devices illustrated in Fig. 8 so that the range of restriction of the adjustable needle valve will be the same as the range of restricting effects of the drip plugs or flow metering devices. The adjustable device of Figs. 6 and 7 may also be modified so as to take the form of the device of the copending application, Serial No. 635,526, filed September 30, 1932, now Patent No. 2,145,245, which permits the setting of the adjustable device so as to permit a limited range of adjustment, with additional means being provided to correct or regulate said range.

To indicate when the reservoir 70 is to be filled, one side of the reservoir 70 may be conveniently recessed, as indicated at 304 in Fig. 3, to receive the tubular gauge glass 305. The lower end of the tubular gauge glass 305 will be in communication with the reservoir 70 through the bore 306 and the insert nipple 314.

The gauge glass will be firmly clamped against the felt washer 307 about the nipple 314 in the recess 308 by the nut 309, which is threaded into the tapped bore 310 in the upper part of the reservoir casing 70. A felt gasket 311 is provided between the nut 309 and the tube 305.

The central bore 312 through the nut 309 will assure communication between the glass 305 and the upper part of the reservoir through the opening 313. The gauge glass 305 will indicate readily the level of lubricant in the reservoir 70 and will enable the operator or supervisor of the machine to refill the lubricator at desired intervals.

It is also to be understood that instead of providing a separate reservoir 70 the pump structure 109 may be suspended from the cover 73 in a pocket recess or crevice in the machine, as shown in Fig. 13, which conveniently may serve as a lubricant reservoir, and from which lubricant may be withdrawn to feed other lubricating systems or for other purposes in and about the machine.

In Figs. 13 and 14 is shown a manually actuated pump which may be employed in addition to (as indicated at 25a in Fig. 1) or in some instances in lieu of the automatically actuated pump shown in Figs. 3 to 5.

Referring to Figs. 13 and 14 the pocket 400 may be arranged at a convenient position on the frame of the machine 401. The upper part of the pocket is provided with enlargements or bosses 402 having the tapped sockets 403 which receive the threaded bolts 404. The cover element 405 is provided with openings 406 to receive the bolts 404 which enable said cover to be clamped into position.

The cover 405 carries the pump carrying structure 407. The pump carrying structure 407 is provided with a tapped recess 408 in which is screwed the depending sleeve 409, the lower portion of which, as indicated at 410, serves as a cylinder to receive the piston 411. The piston 411 consists of the reversed packing cups 412 and 413, which are separated by the annular washer 414 and which receive the metallic cup elements 415 and 416 respectively. The cups 412, 413, 415 and 416 and disk 414 are clamped against the shoulder 417 by the nut 418 which is screwed onto the lower threaded reduced diameter extension 419 of the connecting rod 421.

The connecting rod 421 is encircled by the coil spring 422 which reacts at its upper end 423 against the washer 424 in the bottom of the tapped socket 408 and at its lower end against the washer 425, which is attached to the connecting rod 421 by the pin 426. The connecting rod extends through the bore 427 in the cover structure 407 and at its upper end, it is provided with a handle 428 by which the connecting rod 421 and the piston 411 may be raised to permit charging of the lower end of the cylinder 410.

The lower end of the cylinder 410 is screwed into a tapped socket 429 in the cup structure 430, which carries the inlet ports 431 communicating with the inlet bore 432 of the insert element 433 which is fitted in a recess 434 of the cup structure 430. The insert 433 is pressed into position by the lower end 435 of the sleeve or cylinder 409.

Communication between the inlet ports 431 and the inlet port 432 is assured by means of a peripheral groove 436 regardless of the position of the insert element 433. From the bore 432 there extends vertically upwardly the bore 437 which enlarges to form the inlet valve seat 438 receiving the ball check valve 439.

As indicated in Figs. 13 and 14 the lower end of the extension 420 presses the ball 439 against its seat when the pump is discharged but when the pump is charged lubricant will be directed up past the ball check 439 through the pasages 431 and 32 to charge the pump.

Upon discharge the spring 422 will force the lubricant out through the peripheral vertical passages 440 which communicate with the recess 443 below the insert 433. The recess 443 contains a filter 441 which is backed by the screen 442, the filter being pressed with the screen into the recess 443 by the lower edge 444 of the insert 433.

From the filter 441 the lubricant flows into the passage 445 in the cup element 430 and then into the vertical bore 446. The vertical bore 446 is connected by the coupling 447 to the outlet conduit 448 which is connected by the coupling 449 to the bore 450 in the pump supporting structure 407. The horizontal bore 451 leads to two alternative outlets 452 and 453, the outlet 452 being adapted to feed an external piping system, while the outlet 453 may be particularly adapted to feed a drilled passage in the machine to be lubricated.

By utilizing the pump 25a as shown in Figs. 13 and 14 in combination with the automatic pump shown in Fig. 1, it is possible at that time to flush or flood the bearings with oil by simply drawing upon the handle 428, causing lubricant to be drawn in past the valve 439 and then releasing the handle with the result that the spring 422 will press down the piston 411 and assure discharge into the outlet line 448 and out through the outlets 452 and/or 453 to the bearings to be lubricated.

The pump of Figs. 13 and 14 may also be used by itself (as may also the pump of Figs. 3 to 5) to feed other types of lubricating installations devoid of outlet metering or valve devices or having other metering devices than drip plug systems; and these pumps snugly or in combination may be utilized to feed other than power press bearings.

The installations shown in Figs. 9 to 12 may also be fed by other systems and/or by other pumps than those shown and described.

To fill the reservoir 70, the cover element 73 (see Fig. 4) is preferably provided with an inlet opening 300 having the cover 301 pivotally connected to the inlet opening at 302. As shown in Fig. 5, this inlet opening is provided with the air holes 303.

In Figs. 15 to 22 are shown alternative methods of optionally and manually supplying the distributing system with lubricant when the machine is not operating or to test the system, which may be used in lieu of the additional manual pump, indicated at 25a in Fig. 1 and shown in Figs. 13 and 14.

The devices shown in Figs. 15 to 24 may be associated with or included in the pumping mechanisms shown in Figs. 1 and 2. The structures of the embodiments of Fig. 15; Figs. 16, 17 and 18; Figs. 19 and 20; Fig. 21; Fig. 22; and Figs. 23 and 24 operate in similar manners, the similarly functioning parts in each of these embodiments being indicated by the same numerals, however, provided with a superior 1 for the embodiment of Fig. 15; a superior 2 for the embodiment of Figs. 16, 17 and 18; a superior 3 for the embodiment of Figs. 19 and 20; a superior 4 for the embodiment of Fig. 21; a superior 5 for the embodiment of Fig. 22; and a superior 6 for the embodiment of Figs. 23 and 24.

Referring to Fig. 15, the shaft 15' actuates the lever 24' which is shown slightly out of position as compared to Fig. 2 for purpose of better illustration.

The actuating connection is through the rod 501 having the threaded ends 502 and 503 respectively threaded into the tapped members 504 and 505 and locked in position by the nuts 506 and 507.

The element 504 is provided with a mounting element 508 which is mounted by the screw 509 upon the rotatable shaft element 15'.

The element 505 is provided with an elongated member 510 having the eye 511 which receives the pin 512 at the end of the arm 24', the slotted element 510 preferably being positioned within a yoke member 513 between the jaws of which the pin 512 passes.

By the arrangement, as shown in Fig. 15, it is possible to reciprocate the lever 24' to actuate the connecting rod 95 and the piston of the pump without necessarily operating the machine, where it is desirable to initially fill the lines or to flood the bearings or to test the system when the pump is not operating.

The position of the element 508 at its leftmost position, as shown, is the normal stopping position of the shaft 15'.

Even when the pump is mechanically operated at a short stroke, say ⅛", the slot may be of sufficient length to permit manual operation through the full stroke, say ½", giving a more rapid discharge to the lines on manual operation than would be obtained with the normal operating ⅛" stroke.

In the embodiment of Figs. 16, 17 and 18, the rod $501^2$, which may be connected to a crank, as shown in Fig. 15, is provided with a coupling $505^2$ and a lock nut $507^2$. The element $505^2$ is shown as carrying the cup 514 which receives the slider element 515 provided with the coil spring 516. The end of the slider member has a projecting pin 517 which fits in the bore 518 in the end of the element $505^2$.

The manual gripping element or knurled knob 519 permits the pin to be drawn out of the bore 518, whereupon the lever arm $24^2$ may be manually reciprocated for the purposes above described.

Preferably a series of openings 518 may be provided in the extension $505^2$ or the lever $24^2$ to permit adjustment of the plunger position and stroke.

After manual operation of the device of Figs. 16 and 17, the pin 517 may be readily replaced in any predetermined opening 518 to give the desired stroke.

In the embodiment of Figs. 19 and 20 the rod $501^3$ carries the clevis $505^3$, which clevis is provided with oppositely registering openings $518^3$ which receive the pin 517³ in any predetermined position. The pin is normally held in position by means of the leaf spring 516³ which is riveted at 520 to the arm 24³.

The gripping member or knurled knob 519³ enables the pin to be removed against the spring 516³ to permit optional manual operation of the pump and/or adjustment of the position of the plunger in respect to the position of the rod 501³ connected to the actuating mechanism of the press.

In the embodiment of Fig. 21, the lever 24⁴ is provided with the bore 518⁴ which receives the pin 517⁴ connected to the disk 515⁴. The pin 517⁴ is biased in one direction by the coil spring 516⁴ received in the holder 514⁴.

The lever 24⁴ turns loosely on the shaft 79⁴ while the lever 522 is pinned to the shaft, as indicated at 523.

Therefore, it is apparent that the lever 24⁴ drives the shaft 79⁴ through the lever 522 and this drive may be disconnected by removing the pin 517⁴ from the bore 518⁴ by means of handle 519⁴, permitting manual operation of the pump, or disconnection of the pump from the power press mechanism.

In the embodiment of Fig. 22 the manual connecting device is upon the lever 24⁵.

The lever 522⁵ in the case of this embodiment is provided with a handle 524. The device of this embodiment may be operated in the same manner as the device of Fig. 21.

In the embodiment of Figs. 23 and 24, the lever 24⁶ is operated through the readily detachable link pin 517⁶ which is fixedly held in one knurled member 525 and is threaded into the other tapped knurled member 526.

The pin fits through the bores 527 and 528 respectively in the lever 24⁶ and in the clevis 505⁶.

It is therefore apparent that the applicant has provided a series of constructions in Figs. 15 to 24 which not only permit manual actuation of the pump, when it is desired to achieve optional full stroke operation thereof to charge the system with lubricant or to assure initial over-lubrication, but in addition has provided a series of devices permitting disconnection of the press or other mechanism from the pump and, if desired, an optional adjustment of the piston of the pump in respect to the actuating mechanism.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

What is claimed is:

1. In a power press construction of the type having crank, rolling key clutch, crank shaft, rear head, rear adjusting screw and slide bearings, at least a plurality of which are to be lubricated; the combination therewith of a centralized lubricating installation, comprising a plunger pump having a small discharge, mechanical actuating means connected to the crank shaft of the power press to actuate the plunger of said pump, at a relatively rapid rate, a distributing piping system with flow metering outlets fed from said pump and leading to said plurality of bearings, said flow metering outlets being connected in parallel and having narrow crevices for the flow of lubricant and also having a tremendously higher obstructing effect than the bearings and system so as to predominantly control the distribution of lubricant among the bearings and so as to substantially prevent gravity feed, permitting continuous slow seepage flow only under substantial lubricant pressure applied by said pump, one of said outlets having the same order of obstructing effect as the remaining outlets serving as a return to the pump and being adjustable within the range of said other flow metering outlets to enable the system to accommodate a greater or lesser number of bearings, said piston pump reciprocating with the same frequency as the frequency of rotation of the bearings being lubricated so as to maintain a substantially continuous lubricant pressure throughout operation of said bearings.

2. In a power press construction of the type having crank, rolling key clutch, crank shaft, rear head, rear adjusting screw and slide bearings, at least a plurality of which are to be lubricated; the combination therewith of a centralized lubricating installation, comprising a plunger pump having a small discharge, mechanical actuating means connected to the crank shaft of the power press to actuate the plunger of said pump, at a relatively rapid rate, a distributing piping system with flow metering outlets fed from said pump and leading to said plurality of bearings, and manual means to effect lubrication of said bearings at will, said flow metering outlets being connected in parallel and having narrow crevices for the flow of lubricant and also having a tremendously higher obstructing effect than the bearings and system so as to predominantly control the distribution of lubricant among the bearings and so as to substantially prevent gravity feed, permitting continuous slow seepage flow only under substantial lubricant pressure applied by said pump, one of said outlets having the same order of obstructing effect as the remaining outlets serving as a return to the pump and being adjustable within the range of said other flow metering outlets to enable the system to accommodate a greater or lesser number of bearings, said piston pump reciprocating with the same frequency as the frequency of rotation of the bearings being lubricated so as to maintain a substantially continuous lubricant pressure throughout operation of said bearings.

3. In a lubricating installation for an industrial machine having a plurality of spaced and distributed bearings requiring relatively minute yet accurately proportioned quantities of lubricant; the combination therewith of a lubricating installation comprising a reservoir, an automatically actuated reciprocating piston pump in said reservoir operated incidental to operation of the machine, said reciprocating pump having a relatively small plunger of limited discharge, means to actuate said reciprocating pump so as to cause a frequent discharge thereof, a piping system with flow metering outlets receiving said discharge, and a manually actuated pump connected to said system adapted to flood or flush the bearings at desired intervals, said flow metering outlets being connected in parallel and having narrow crevices for the flow of lubricant and also having a tremendously higher obstructing effect than the bearings and system so as to predominantly control the distribution of lubricant among the bearings and so as to substantially prevent gravity feed, permitting continuous slow seepage flow only under substantial lubricant pressure applied by said pump, one of said outlets having the same order of obstructing effect as the remaining outlets serving as a return to the pump and being adjustable within the range of said other flow metering outlets to enable the system to accommodate a greater or lesser number of bearings, said piston pump reciprocating with the same frequency as the frequency of rotation of the bearings being lubricated so as to maintain a substantially continuous lubricant pressure throughout operation of said bearings.

4. In a lubricating installation of the type having distributing conduits with flow control means for a mechanism having a plurality of spaced and distributed bearings to be lubricated; the combination therewith of a central pump unit feeding said system, said pump unit including a reservoir, an actuating mechanism at the top of said reservoir, a plunger and a cylinder unit in the bottom of said reservoir with inlet and outlet connections, said actuating mechanism and plunger-cylinder unit being carried by said cover and means to lubricate said actuating mechanism from said plunger and cylinder unit while said unit is feeding said piping, said actuating mechanism, said plunger and cylinder unit, said lubricating means, and said inlet and outlet connections being altogether devoid of connection to the reservoir and being removable from the reservoir by removal of the cover.

5. In a lubricating installation of the type having distributing conduits with flow control means for a mechanism having a plurality of spaced and distributed bearings to be lubricated; the combination therewith of a central pump unit feeding said system, said pump unit including a reservoir, a cover therefor, an actuating mechanism at the top of said reservoir carried by said cover, a plunger and a cylinder unit in the bottom of said reservoir carried by said cover, said actuating mechanism including a reciprocating shaft having a bearing on said cover, said cover having a cup into which said shaft extends, a connecting rod extending upwardly from said plunger to within said cup, a lever from said shaft to the upper end of said connecting rod and means to feed lubricant into said cup.

6. In a lubricating installation of the type having distributing conduits with flow control means for a mechanism having a plurality of spaced and distributed bearings to be lubricated; the combination therewith of a central pump unit feeding said system, said pump unit including a reservoir, an actuating mechanism at the top of said reservoir, a plunger and a cylinder unit in the bottom of said reservoir, an outlet connection from said plunger-cylinder unit to said conduits and a needle valve restriction upon said connection to permit a proportional part of the discharge of the pump to return to the reservoir, said means and said restriction affording about the same order of obstruction to the flow of lubricant, which is tremendously higher than the obstructing effect of the distributing conduits and the bearings to be lubricated, so that only a slow continuous flow or seepage of lubricant will be permitted under substantial pump pressure.

7. In a lubricating installation of the type having distributing conduits with flow control means for a mechanism having a plurality of spaced and distributed bearings to be lubricated; the combination therewith of a central pump unit feeding said system, said pump unit including a reservoir, an actuating mechanism at the top of said reservoir, a plunger and a cylinder unit in the bottom of said reservoir, said actuating mechanism being carried by said cover and means to lubricate said mechanism from said plunger-cylinder unit while feeding said piping, said latter means including an outlet connection from said plunger-cylinder unit to said conduits and a needle valve restriction upon said connection to permit a proportional part of the discharge of the pump to flow to said actuating mechanism, said needle valve being flatted to assure a limited flow to said actuating mechanism even when the needle valve is completely closed.

8. In a power press lubrication installation, an automatically actuated pump at a relatively low level, a junction at a high level above the bearings to be lubricated, a pressure connection from said pump to said junction, said pump being provided with an adjustable flow restriction means to regulate the flow from said pump into said connection, a plurality of highly restricted, pressure absorbing flow proportioning outlets attached to said junction and tail pipes extending from said junction to the bearings to be lubricated, said adjustable flow restriction means and said flow proportioning outlets at all times having a restricting effect substantially tremendously greater than that encountered in the pipes and the bearings so as to predominantly control the distribution of lubricant and so as to permit only a continuous slow seepage of lubricant under substantial pump pressure.

9. In a power press lubrication installation for a press of the type having a guard with a hinged opening and a flywheel bearing arrangement to be lubricated, a pump, a feed line extending from the pump to the bearing and having sections attached to the sides of said guard and a flexible hose extending across said hinge allowing opening of said guard without disruption of said feed line.

10. In a drip plug distributing system, a reservoir, a pump and a needle valve bypass to the reservoir, said pump being provided with an actuating mechanism lubricated by the lubricant flowing through said bypass, said needle valve having a flat surface assuring a limited return flow to lubricate said actuating mechanism even when the needle valve is closed.

11. In a power press lubrication installation to supply the flywheel, key and adjacent bearings thereof, an annular casing at the end of the structure to be lubricated provided with a central opening, a hub bolted to said casing, a cylindrical outer bearing element keyed to said hub, an inner bearing element positioned inside of said outer bearing element, a lubricant conduit extending longitudinally through said outer bearing element and communicating with the interior of said casing, and a fixed drip connection discharging through said central opening into said casing.

12. In a lubricating installation of the type having distributing conduits with flow control means for a mechanism having a plurality of spaced and distributed bearings to be lubricated; the combination therewith of a central pump unit feeding said system, said pump unit including a reservoir, an actuating mechanism at the top of said reservoir, a plunger and a cylinder unit in the bottom of said reservoir, said plunger being spring returned and being carried in a tube depending from said cover, the lower portion of which tube constitutes the cylinder, a cup closing the bottom of said cylinder and an insert with inlet and outlet ports and an inlet check valve in said cup, said check valve being closed upon completed discharge of the piston by direct contact with said spring returned piston.

13. In a centralized lubricating system feeding bearings of a mechanism, an automatically actuated pump having a cylinder, a reciprocating piston, a connecting rod for said piston, a bell crank lever with two arms, one connected to said connecting rod, a detachable link connected to the other arm, said other arm being independently reciprocable upon detachment of said link and thus enabling optional manual operation of the pump to obtain initial flooding of the bearings and filling of the system with lubricant.

14. A lubricant pump construction including an actuating element, an ejecting element, a casing element for said ejecting element, a connecting element between said actuating element and said ejecting element, an outlet element from the casing element, all of said elements being carried by a removable cover casting element adapted to cover a reservoir enclosure for lubricant and being removable as a unit from said reservoir by removal of said cover, said casing and ejecting element depending into said reservoir and said actuating element having a bearing support on said cover, said outlet element including a branched bore in said cover, one branch being adapted to be connected to an external piping system and the other to an internal bore system, and means to block off one or both of said branches.

15. A reciprocating piston lubricant pump having piston, cylinder, a connecting rod having its axis extending in the same direction as the axes of said piston and cylinder, a two-arm lever to actuate said connecting rod, said lever including a shaft connecting said arms having its axis transverse to the axis of said connecting rod, one of said arms being connected at one end to said shaft and at the other end to said connecting rod, a rod extending from said lever to a moving element of a bearing to be lubricated to automatically reciprocate said piston, and a connection between said rod and outside arm enabling optional manual reciprocation of said outside arm and said piston without reciprocatory movement of said rod.

16. The pump of claim 15 in which said connection includes a slotted member.

17. The pump of claim 15 in which said connection includes a detachable pin.

18. In a lubricating installation of the type having distributing conduits with flow control means for a mechanism having a plurality of spaced and distributed bearings to be lubricated; the combination therewith of a receptacle to receive a body of lubricant and serve as a reservoir and a central pump unit feeding said system, said pump unit including a frame structure with a cover to close and cover the top of said receptacle and a depending leg, said cover also being designed to fit on top of a portion of said mechanism, an actuating arrangement carried on said cover, a plunger and a cylinder unit carried at the bottom of said leg, and an outlet from said plunger-cylinder unit to said cover, and communicating bores in said cover, one of said bores leading to the portion of the cover fitting on top of said mechanism and serving as a connection to an internal bore system in the mechanism and the other bore having an external connection for an external piping system on the mechanism, said actuating arrangement, plunger and cylinder unit, outlet and communicating bores being removable as a unit from said reservoir by removing said cover.

19. A lubricating installation for a main mechanism having a plurality of bearings to be lubricated with relatively accurately proportioned quantities of lubricant during the operation of the mechanism, said installation including a central lubricant supply having a well for receiving lubricant, a cover for said well, said supply being carried by the mechanism, a central lubricant pressure source fed from said supply, a distributing conduit system with an inlet to receive lubricant under pressure from said source and distribute it through outlets to the bearings of said main mechanism, said system being provided with a plurality of flow proportioning devices substantially preventing gravity flow and only permitting slow seepage flow under substantial applied pressure from said source and having an obstructing effect tremendously greater than the conduits and the bearings so as to predominately control the proportioning of lubricant among said bearings, said conduit system being maintained substantially completely filled with lubricant so that lubricant pressure will be applied through a column of lubricant in the conduit system by the force upon the outlets without substantial diminution, said pressure source being a reciprocating piston pump with a small elongated plunger and being provided with an actuating mechanism above and supported by said cover and operated by the moving element of one of said bearings to move with the same frequency as the moving element of said bearing and maintain a continuous lubricant pressure in the system during operation with constant flow past said devices, and a pump cylinder receiving said plunger, said cylinder being below, depending and supported by said cover and extending into lubricant in said well, and an outlet from said cylinder at said cover.

20. The combination of claim 19 in which said cover carries a cup receiving said actuating mechanism and a connection from one of said devices to said cup to feed lubricant thereto.

21. The combination of claim 19 in which said actuating mechanism is lubricated by said conduit system, one of said devices being provided with an adjustment and with an outlet to said mechanism.

22. The combination of claim 19 in which said actuating mechanism is lubricated by said conduit system, one of said devices being provided with a needle valve controlling an outlet to said mechanism.

23. The combination of claim 19 in which said actuating mechanism is lubricated by said conduit system, one of said devices being provided with a needle valve controlling an outlet to said mechanism, said needle valve being provided with a flat surface so it will feed said mechanism even when closed.

24. The combination of claim 19 in which one of said devices is adjustable to enable accommodation of the system to a larger or smaller number of bearings.

25. In a centralized lubricating installation, a central reservoir, a central pump in said reservoir, a conduit system fed from said pump, high restriction metering outlets from said system to the bearings and a high restriction metering outlet from said system to the reservoir, said latter outlet being adjustable and having about the same restriction effect as the former outlets.

26. In a centralized lubricating installation, a central reservoir, a central pump in said reservoir, a conduit system fed from said pump, high restriction metering outlets from said system to the bearings and a high restriction metering outlet from said system to the reservoir, said latter outlet being adjustable and having about the same restriction effect as the former outlets, each of said outlets having a check valve.

EDWARD H. KOCHER.